United States Patent
Agiwal et al.

(10) Patent No.: US 11,877,322 B2
(45) Date of Patent: Jan. 16, 2024

(54) METHOD AND APPARATUS FOR RANDOM ACCESS PREAMBLE GROUP SELECTION IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 17/309,852

(22) PCT Filed: Jan. 29, 2021

(86) PCT No.: PCT/KR2021/001252
§ 371 (c)(1),
(2) Date: Jun. 23, 2021

(87) PCT Pub. No.: WO2021/157969
PCT Pub. Date: Aug. 12, 2021

(65) Prior Publication Data
US 2022/0272758 A1   Aug. 25, 2022

Related U.S. Application Data

(60) Provisional application No. 62/971,464, filed on Feb. 7, 2020.

(51) Int. Cl.
*H04W 74/08* (2009.01)

(52) U.S. Cl.
CPC .............................. *H04W 74/0833* (2013.01)

(58) Field of Classification Search
CPC .......... H04W 74/0833; H04W 74/002; H04W 74/004
See application file for complete search history.

(56) References Cited

U.S. PATENT DOCUMENTS

| | | |
|---|---|---|
| 2018/0220345 A1 | 8/2018 | Moon et al. |
| 2018/0368188 A1 | 12/2018 | Aiba et al. |
| 2019/0132882 A1 | 5/2019 | Li et al. |

(Continued)

FOREIGN PATENT DOCUMENTS

KR   10-2019-0105035 A   9/2019

OTHER PUBLICATIONS

Decision of Patent dated Apr. 26, 2023, in connection with Korean Application No. 10-2021-7017707, 10 pages.

(Continued)

*Primary Examiner* — Jae Y Lee

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and an apparatus for random access preamble group selection.

14 Claims, 5 Drawing Sheets

(56) References Cited

U.S. PATENT DOCUMENTS

2020/0146069 A1\* 5/2020 Chen .................. H04W 52/362
2020/0344812 A1 10/2020 Agiwal et al.
2021/0227587 A1\* 7/2021 Tsai ................. H04W 56/0045
2022/0279591 A1\* 9/2022 Zhao ................. H04W 74/0808
2022/0338266 A1\* 10/2022 Jeon ................. H04W 74/0833

OTHER PUBLICATIONS

Intel Corporation, "Fallback to 4-step procedure," R2-1906279, 3GPP TSG RAN WG2 #106, Reno, Nevada, US, May 13-17, 2019, 4 pages.
International Search Report and Written Opinion of the International Searching Authority dated May 3, 2021 in connection with International Application No. PCT/KR2021/001252, 8 pages.
Nokia, et al., "Feature lead summary#1 on 2 step RACH procedures," R1-1910693, 3GPP TSG RAN WG1 #98bis, Chongqing, China, Oct. 14-18, 2019, 58 pages.
ZTE Corporation, et al., "Draft MAC CR for 2-step CFRA," R2-1915268, 3GPP TSG-RAN WG2 Meeting #108, Reno, USA, Nov. 18-22, 2019, 39 pages.
Supplementary European Search Report dated Mar. 2, 2022, in connection with European Application No. 21750085.9, 9 pages.
ZTE Corporation, et al., "Running MAC CR for 2-step RACH," R2-1914798, 3GPP TSG-RAN WG2 Meeting #108, Reno, USA, Nov. 18-22, 2019, 25 pages.
3GPP TS 38.321 V15.8.0 (Dec. 2019), Technical Specification, 3rd Generation Partnership Project; Technical Specification Group Radio Access Network; NR; Medium Access Control (MAC) protocol specification (Release 15), Dec. 2019, 78 pages.

\* cited by examiner

FIG. 2

| Channel Access Priority Class (P) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2ms | {3, 7} |
| 2 | 1 | 7 | 15 | 3ms | {7, 15} |
| 3 | 3 | 15 | 63 | 8 or 10ms* | {15, 31, 63} |
| 4 | 7 | 15 | 1023 | 8 or 10ms* | {15, 31, 63, 127, 255, 511, 1023} |

FIG. 3

| Channel Access Priority Class (P) | 5QI |
|---|---|
| 1 | 1, 3, 5, 65, 66, 67, 69, 70, 79, 80, 82, 83, 84, 85 |
| 2 | 2, 7, 71 |
| 3 | 4, 6, 8, 9, 72, 73, 74, 76 |
| 4 | - |

METHOD AND APPARATUS FOR RANDOM ACCESS PREAMBLE GROUP SELECTION IN WIRELESS COMMUNICATION SYSTEM

CROSS-REFERENCE TO RELATED APPLICATIONS

This application is a 371 National Stage of International Application No. PCT/KR2021/001252, filed Jan. 29, 2021, which claims priority to U.S. Provisional Application No. 62/971,464, filed Feb. 7, 2020, the disclosures of which are herein incorporated by reference in their entirety.

BACKGROUND

1. Field

The disclosure relates to a wireless communication system. Specifically, the disclosure relates to an apparatus, a method and a system for random access preamble group selection in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance random access procedure for wireless communication system.

SUMMARY

There are needs to enhance current random access procedure for next generation wireless communication system.

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal including: identifying that a preamble transmission counter for a 2-step random access procedure equals a message A transmission maximum number+1; switching a random access type from 2-step to 4-step; identifying whether a first random access preambles group was selected during the 2-step random access procedure; selecting a second random access preambles group for a contention-based 4-step random access procedure based on a message A configuration for the 2-step random access procedure, in case that the first random access preambles group was not selected during the 2-step random access procedure; and performing a random access preamble transmission for the contention-based 4-step random access procedure by using the second random access preambles group.

In accordance with another aspect of the disclosure, a terminal includes: a transceiver configured to transmit and receive a signal; and a controller configured to: identify that a preamble transmission counter for a 2-step random access procedure equals a message A transmission maximum number+1, switch a random access type from 2-step to 4-step, identify whether a first random access preambles group was selected during the 2-step random access procedure, select a second random access preambles group for a contention-based 4-step random access procedure based on a message A configuration for the 2-step random access procedure, in case that the first random access preambles group was not selected during the 2-step random access procedure, and perform a random access preamble transmission for the contention-based 4-step random access procedure by using the second random access preambles group.

According to various embodiments of the disclosure, random access procedure can be efficiently enhanced.

BRIEF DESCRIPTION OF THE DRAWINGS

The above and other aspects, features, and advantages of certain embodiments of the disclosure will be more apparent

FIG. 2 illustrates an exemplary listen-before-talk (LBT) parameters in accordance with an embodiment of the disclosure.

FIG. 3 illustrates an exemplary channel access priority class (CAPC) values in accordance with an embodiment of the disclosure.

Throughout the drawings, like reference numerals will be understood to refer to like parts, components, and structures.

DETAILED DESCRIPTION

Figure 1:
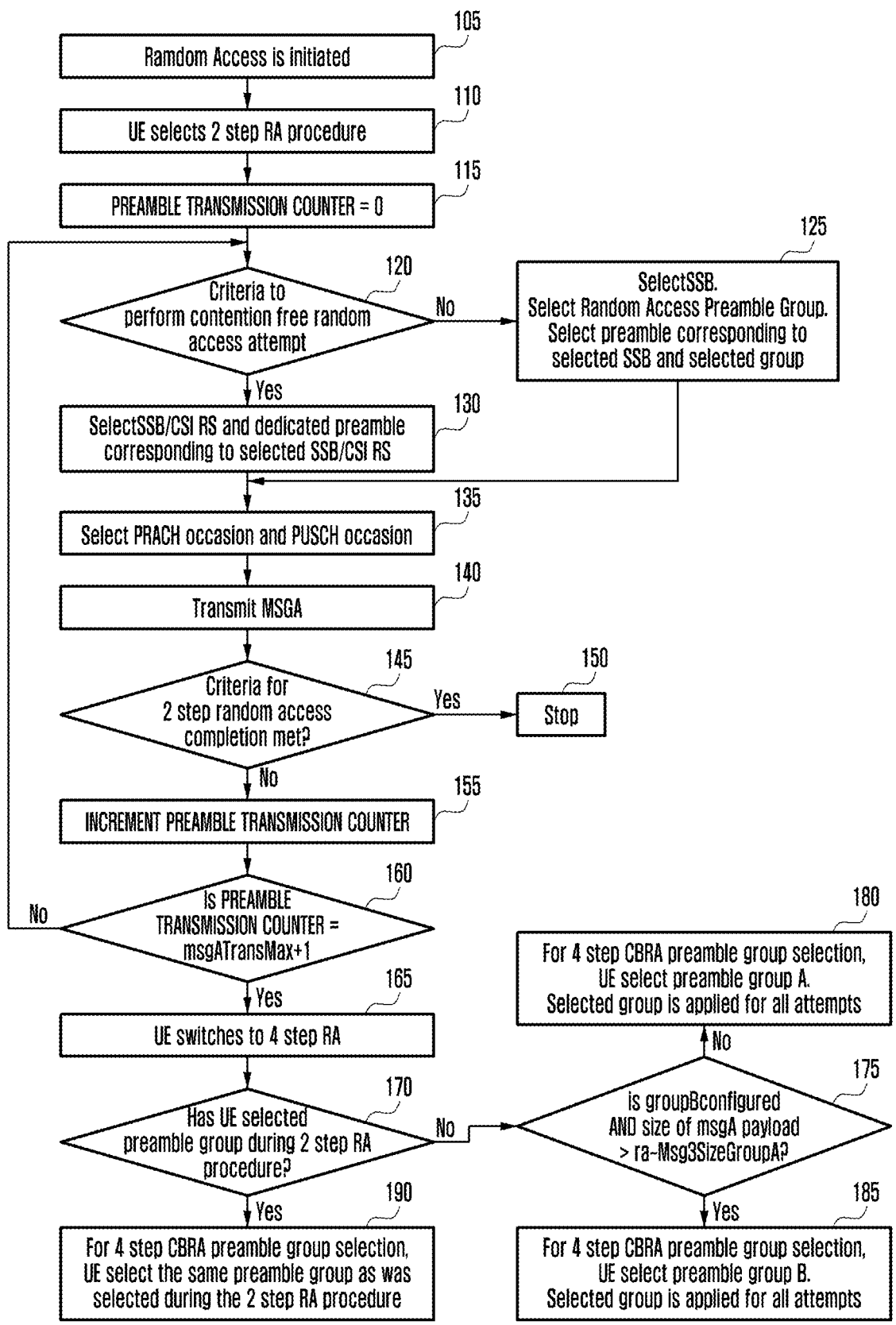
FIG. 1 illustrates a flow chart showing random access preamble group selection in accordance with an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, MIMO, FD-MIMO, array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc.

However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (e.g., mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as RX beam.

The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilise radio resources provided by two distinct schedulers, located in two different nodes connected via a non-ideal backhaul and providing either Evolved Universal Mobile Telecommunications System (UMTS) Terrestrial Radio Access (E-UTRA (i.e. if the node is an ng-eNB)) or NR access (i.e. if the node is a gNB). In NR for a UE in RRC_CONNECTED not configured with carrier aggregation (CA)/DC, there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (SCells). In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (or gNB) or base station in cell broadcast Synchronization Signal and Physical Broadcast Channel (PBCH) block (i.e., SSB) consists of primary and secondary synchronization signals (PSS, SSS) and system information. System information includes common parameters needed to communicate in cell. In the fifth generation wireless communication system (also referred as next generation radio or NR), System Information (SI) is divided into the Master information Block (MIB) and a number of System Information Blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid-automatic repeat request (ARQ) information related to DL-SCH; Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the Physical Resource Block(s) (PRB(s)) and Orthogonal Frequency Division Multiplexing (OFDM) symbol(s) where the UE may assume no transmission is intended for the UE; Transmission of Transmission Power Control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. Quadrature Phase Shift Keying (QPSK) modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot}) \mod (\text{Monitoring-periodicity-PDCCH-slot})=0;$$ [equation 1]

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each coreset configuration is associated with a list of TCI (Transmission configuration indicator) states. One DL reference signal (RS) ID (either SSB or channel state information RS (CSI-RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the Medium Access Control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. RA is used to achieve UL time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH TX occasion or RA channel (RACH) occasion) in which RA preamble was detected by gNB. The RA-RNTI is calculated as follows: $RA\text{-}RNTI = 1 + s\_id + 14*t\_id + 14*80*f\_id + 14*80*8*ul\_carrier\_id$, where $s\_id$ is the index of the first OFDM symbol of the PRACH occasion where UE has transmitted Msg1, i.e. RA preamble; $0 \leq s\_id < 14$; $t\_id$ is the index of the first slot of the PRACH occasion ($0 \leq t\_id < 80$); $f\_id$ is the index of the PRACH occasion within the slot in the frequency domain ($0 \leq f\_id < 8$), and $ul\_carrier\_id$ is the UL carrier used for Msg1 transmission (0 for normal UL (NUL) carrier and 1 for supplementary UL (SUL) carrier). Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for Scell, etc. Evolved node B (eNB) or gNB assigns to UE dedicated Random access preamble. UE transmits the dedicated RA preamble. ENB or gNB transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non-dedicated preamble. Dedicated preambles is typically provided for a subset of SSBs/CSI-RSs. If there is no SSB/CSI-RS having DL reference signal received power (RSRP) above a threshold amongst the SSBs/CSI-RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of CCCH service data unit (SDU), dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP (transmission and reception point) switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non-dedicated preamble. Dedicated preambles is typically provided for a subset of SSBs/CSI-RSs. If there is no SSB/CSI RS having DL RSRP above a threshold amongst the SSBs/CSI-RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

Here, for 4 step CBRA, there can be up to two random access preamble groups, which are random access preamble group A and random access preamble group B. Similarly for 2 step CBRA, there can be up to two random access preamble groups, which are random access preamble group A and random access preamble group B. In case UE selects 2 step random access procedure when random access is initiated, after 'msgATransMax' unsuccessful MsgA attempts during the 2 step random access procedure, UE switches to 4 step CBRA. Upon switching to 4 step RA, during the 4 step CBRA, UE select the same preamble group (random access preamble group A or random access preamble group B) as was selected during the 2 step RA procedure as shown below:

Random Access Preamble Group Selection during the 4 step CBRA:

1> if the RA Type is switched from 2-step RA to 4-step RA:
  2> select the same group of Random Access Preambles as was selected for 2-step Random Access;
1> else if Msg3 has not yet been transmitted:
  2> if Random Access Preambles group B is configured:
    3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
    3> if the Random Access procedure was initiated for the CCCH logical channel and the CCCH SDU size plus MAC subheader is greater than ra-Msg3SizeGroupA:

4> select the Random Access Preambles group B.
3> else:
4> select the Random Access Preambles group A.
2> else:
3> select the Random Access Preambles group A.
1> else (i.e. Msg3 is being retransmitted):
2> select the same group of Random Access Preambles as was used for the Random Access Preamble transmission attempt corresponding to the first transmission of Msg3.

Preamble group selection is performed only during the 2 step CBRA. Preamble group selection is not performed during the 2 step CFRA. So if all the 2 step RA attempts before switching to 4 step RA are based on contention free resources, existing mechanism does not work. So some enhancement is needed.

[Embodiment 1]—Preamble Group Selection Upon Switching from 2 Step RA to 4 Step RA FIG. 1 illustrates a flow chart showing random access preamble group selection in accordance with an embodiment of the disclosure.

Step 0: During the random access procedure initialization (105), UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure.

Upon selecting the UL carrier, UE determines the UL and DL BWP for random access procedure as specified in section 5.15 of TS 38.321 as shown below:

For the selected carrier of this Serving Cell:
1> if PRACH occasions are not configured for the active UL BWP; or
1> if the random access procedure is initiated by PDCCH order and the ra-PreambleIndex explicitly provided by PDCCH is not 0b000000 and 4 step PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP.
1> else:
2> if the Serving Cell is an SpCell:
3> if the active DL BWP does not have the same bwp-Id as the active UL BWP:
4> switch the active DL BWP to the DL BWP with the same bwp-Id as the active UL BWP.

UE then determine whether to perform 2 step or 4 step RACH for this random access procedure.

If this random access procedure is initiated by PDCCH order and if the ra-PreambleIndex explicitly provided by PDCCH is not 0b000000; or
if the Random Access procedure was initiated for SI request and the Random Access Resources for SI request have been explicitly provided by RRC; or
if the Random Access procedure was initiated for beam failure recovery and if the contention-free Random Access Resources for beam failure recovery request for 4-step random access have been explicitly provided by RRC for the BWP selected for random access procedure; or
if the Random Access procedure was initiated for reconfiguration with sync and if the contention-free Random Access Resources for 4-step random access have been explicitly provided in rach-ConfigDedicated for the BWP selected for random access:
UE selects 4 step RA.
else if the BWP selected for random access procedure is configured with both 2-step and 4-step random access resources and the RSRP of the downlink pathloss reference is above RSRP_THRESHOLD_RA_TYPE_SELECTION; or
if the BWP selected for random access procedure is only configured with 2-step random access resources (i.e. no 4-step RACH resources configured); or
if the Random Access procedure was initiated for reconfiguration with sync and if the contention-free Random Access Resources for 2-step random access have been explicitly provided in rach-ConfigDedicated for the BWP selected for random access:
UE selects 2 step RA.
Else: UE selects 4 step RA UL carrier for random access procedure is explicitly signaled by gNB during handover or reconfiguration with sync for 4 step RACH. If gNB wants UE to select NUL for 4 step RACH, it provides 4 step contention free random access resources for NUL in reconfiguration message. If gNB wants UE to select SUL for 4 step RACH, it provides 4 step contention free random access resources for SUL in reconfiguration message. In an embodiment, UL carrier for 2 step random access procedure is also explicitly signaled by gNB during handover or reconfiguration with sync. If gNB want UE to select NUL for 2 step RACH, it provides 2 step contention free random access resources for NUL in reconfiguration message. If gNB wants UE to select SUL for 2 step RACH, it provides 2 step contention free random access resources for SUL in reconfiguration message.

If 2 step contention free random access resources for SUL is signaled by gNB during handover or reconfiguration with sync, UE selects SUL and RACH type selected is 2 step RACH. If 2 step contention free random access resources for NUL is signaled by gNB during handover or reconfiguration with sync, UE selects NUL and RACH type selected is 2 step RACH. If 4 step contention free random access resources for SUL is signaled by gNB during handover or reconfiguration with sync, UE selects SUL and RACH type selected is 4 step RACH. If 4 step contention free random access resources for NUL is signaled by gNB during handover or reconfiguration with sync, UE selects NUL and RACH type selected is 4 step RACH.

Based on the above criteria, UE has selected 2 step RA procedure (110). UE initializes the preamble transmission counter (PREAMBLE_TRANSMISSION_COUNTER) to zero (115).

Step 1A: If contention Free Random Access Resources are provided by gNB and there is at least one SSB/CSI-RS having SS-RSRP/CSI-RSRP above a threshold amongst the SSBs/CSI-RSs for which contention free random access resources are provided (120), UE transmit MSGA i.e. Random Access Preamble in PRACH occasion and MAC PDU in PUSCH Occasion using the assigned contention free random access resources (140).

In this case UE selects an SSB/CSI-RS having SS-RSRP/CSI-RSRP above a threshold amongst the SSBs/CSI-RSs for which contention free random access resources are provided (130). UE selects the random access preamble (ra-PreambleIndex) assigned by gNB corresponding to selected SSB/CSI-RS. UE selects the next available PRACH occasion corresponding to selected SSB/CSI-RS (135). UE select the PUSCH occasion corresponding to selected PRACH occasion and preamble (135). (Note that there can be several PUSCH occasions/resources corresponding to a PRACH slot of selected PRACH occasion. gNB may indicate which PUSCH occasion/resource to be used in dedicated signaling for a given SSB/CSI-RS).

Step 1B: Otherwise (i.e. If contention Free Random Access Resources are not provided by gNB or is there is no available SSB/CSI-RS having SS-RSRP/CSI-RSRP above a threshold amongst the SSBs/CSI-RSs for which contention free random access resources are provided (120), UE transmit MSGA i.e. Random Access Preamble in PRACH occasion and MAC PDU in PUSCH Occasion using the contention based random access resources (140).

In this case UE selects an SSB having SS-RSRP above a threshold amongst the transmitted SSBs (125). If no SSB having SS-RSRP above a threshold is available, UE select any SSB (125). UE select random access preamble group as follows (125):

1> if contention free random access resources for 2 step RA have not been configured and if random access preamble group has not yet been selected during the current random access procedure:

2> if Random Access Preambles group B for 2-step RA is configured:

3> if the potential MSGA payload size (UL data available for transmission plus MAC header and, where required, MAC CEs) is greater than the transport block size of the MSGA payload associated with preamble group A and the nominal required PUSCH power for MSGA determined according to subclause 7.1.1 of TS 38.213 [6] is less than PCMAX (of the Serving Cell performing the Random Access Procedure); (alternately, if the potential MSGA payload size (UL data available for transmission plus MAC header and, where required, MAC CEs) is greater than ra-MsgASizeGroupA and the pathloss is less than PCMAX (of the Serving Cell performing the Random Access Procedure)—msgA-preambleReceivedTargetPower—msgA-DeltaPreamble—messageAPowerOffsetGroupB); or 3> if the Random Access procedure was initiated for the CCCH logical channel and the CCCH SDU size plus MAC subheader is greater than ra-MsgASizeGroupA (i.e. the transport block size of the MSGA payload associated with preamble group A):

4> select the Random Access Preambles group B.

3> else:

4> select the Random Access Preambles group A.

2> else:

3> select the Random Access Preambles group A.

1> else if MSGA has been transmitted using contention free random access resources and has not yet been transmitted using contention based random access resources (i.e. if contention-free Random Access Resources for 2-step RA type have been configured and if Random Access Preambles group has not yet been selected during the current Random Access procedure):

2> if Random Access Preambles group B for 2-step RA is configured and if the payload size of the MSGA (including the MAC header and all the MAC CEs) is greater than the transport block size of the MSGA payload size associated with preamble group A (or if Random Access Preambles group B for 2-step RA is configured and if the transport block size or payload size of the MSGA is equal to the transport block size of the MSGA payload size associated with preamble group B):

3> select the Random Access Preambles group B.

2> else:

3> select the Random Access Preambles group A.

1> else (i.e. MSGA is being retransmitted using contention based random access resources, in other words Random Access preambles group has been selected during the current Random Access procedure):

2> select the same group of Random Access Preambles as was used for the Random Access Preamble transmission attempt corresponding to the first transmission of MSGA using contention based random access resources.

UE select a Random Access Preamble randomly with equal probability from the Random Access Preambles associated with the selected SSB and the selected Random Access Preambles group. UE selects the next available PRACH occasion corresponding to selected SSB/CSI-RS. UE select the PUSCH occasion corresponding to selected PRACH occasion and preamble (135).

Step 2: UE then starts msgB-ResponseWindow and monitor the PDCCH for random access response in msgB-ResponseWindow. UE monitors the PDCCH of the SpCell for a random access response identified by MSGB-RNTI while the msgB-ResponseWindow is running. If C-RNTI MAC CE was included in the MSGA: UE additionally monitor the PDCCH of the SpCell for random access response identified by the C-RNTI while the msgB-ResponseWindow is running.

Step 3: While msgB-ResponseWindow is running:

If C-RNTI was included in MsgA and UE receives PDCCH addressed to C-RNTI and this random access procedure was initiated for BFR: RAR reception is successful. RA procedure is successfully completed. Go to step 8 (145, 150).

Else If C-RNTI was included in MsgA and time alignment timer (TAT) timer associated with primary timing advance group (PTAG) is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that UE will not use these resources for subsequent random access procedure. Go to step 8 (145, 150). In an embodiment, release operation may not be performed in this case, as contention free resources may not be configured for the case where PTAG is running and RA is initiated for events other than BFR.

Else If C-RNTI was included in MsgA and TAT timer associated with PTAG is not running and UE receives PDCCH addressed to C-RNTI and DL transport block (TB) scheduled by this PDCCH includes Absolute timing advanced command MAC CE: RAR reception is successful. RA procedure is successfully completed. UE releases the 2 step CFRA resources (random access preamble(s), RACH occasions, PUSCH resources) configured (if any) for this random access procedure.

Go to step 8 (145, 150). Release here means that UE will not use these resources for subsequent random access procedure.

Else If UE receives PDCCH addressed to MSGB-RNTI and decoded TB includes fallbackRAR MAC subPDU corresponding to its transmitted preamble: RAR reception is successful.

If random access preamble transmitted is contention free random access preamble: RA procedure is successfully completed. UE releases the 2 step CFRA resources (random access preamble(s), RACH occasions, PUSCH resources) configured (if any) for this random access procedure. Process the receive TA command for SpCell. Transmit MsgA MAC PDU as Msg3 in UL grant received in fallbackRAR. Go to step 8 (145, 150). Release here means that UE will not use these resources for subsequent random access procedure.

Else
    Process the receive TA command for SpCell. Transmit MsgA MAC PDU as Msg3 in UL grant received in fallbackRAR
    Start contention resolution timer
    Go to step 5

Else If UE receives PDCCH addressed to MSGB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8 (145, 150). Note that this is the case when CCCH SDU is included in MSGA, which means that UE is in idle/inactive or performing RRC connection re-establishment. For these cases contention free resources are not configured, so no need to release. In an alternate embodiment, UE releases the 2 step CFRA resources (random access preamble(s), RACH occasions, PUSCH resources) configured (if any) for this random access procedure. Release here means that UE will not use these resources for subsequent random access procedure.

Step 4: If RAR window expires (145):
Increment PREAMBLE_TRANSMISSION_COUNTER by 1 (155).
    If msgATransMax is configured, and if PREAMBLE_TRANSMISSION_COUNTER= msgATransMax+1 (160):
        Switch to 4 step RA. Go to step 7 (165).
    Else:
        go to step 1

Step 5: While contention resolution timer is running:
If the Random Access procedure was initiated for beam failure recovery and the UE receives PDCCH transmission addressed to the C-RNTI; or if the Random Access procedure was initiated by a PDCCH order and the UE receives PDCCH transmission addressed to the C-RNTI; or if the Random Access procedure was initiated by the MAC sublayer itself or by the RRC sublayer and the UE receives PDCCH transmission addressed to the C-RNTI and contains a UL grant for a new transmission: Contention Resolution is successful; RA procedure is successfully completed. Release 2 step CFRA Resources i.e. preambles/ROs/PUSCH Resources configured (if any) for this RA procedure. Go to step 8 (145, 150). Release here means that UE will not use these resources for subsequent random access procedure.

Step 6: If contention resolution timer expires (145):
Increment PREAMBLE_TRANSMISSION_COUNTER by 1 (155).
    If msgATransMax is configured, and if PREAMBLE_TRANSMISSION_COUNTER= msgATransMax+1 (160):
        Switch to 4 step RA. Go to step 7 (165).
    Else:
        go to step 1

Step 7: perform 4 step RA (165).
UE performs random access attempt for 4 step RA as follows:
    If contention Free Random Access Resources are provided by gNB and there is at least one SSB/CSI-RS having SS-RSRP/CSI-RSRP above a threshold amongst the SSBs/CSI-RSs for which contention free random access resources are provided, UE Transmit Msg1 i.e. Random Access Preamble in PRACH occasion using the assigned contention free random access resources.
        In this case UE selects an SSB/CSI-RS having SS-RSRP/CSI-RSRP above a threshold amongst the SSBs/CSI-RSs for which contention free random access resources are provided. UE selects the random access preamble (ra-PreambleIndex) assigned by gNB corresponding to selected SSB/CSI-RS. UE selects the next available PRACH occasion corresponding to selected SSB/CSI-RS.
    Otherwise (i.e. If contention Free Random Access Resources are not provided by gNB or is there is no available SSB/CSI-RS having SS-RSRP/CSI-RSRP above a threshold amongst the SSBs/CSI-RSs for which contention free random access resources are provided, UE transmit MSG1 i.e. Random Access Preamble in PRACH occasion using the contention based random access resources.
        In this case UE selects an SSB having SS-RSRP above a threshold amongst the transmitted SSBs. If no SSB having SS-RSRP above a threshold is available, UE select any SSB. UE select a Random Access Preamble randomly with equal probability from the Random Access Preambles associated with the selected SSB and the selected Random Access Preambles group. UE selects the next available PRACH occasion corresponding to selected SSB/CSI-RS.

In an embodiment UE select random access preamble group as follows upon switching to 4 step RA:
1> if the RA Type is switched from 2-step RA to 4-step RA (165):
    2> if Random Access Preambles group was selected for 2-step Random Access (or if contention based random access resource or preamble was selected during the 2-step Random Access or if all the 2 step random access attempts were not based on contention free resources) (170):
        3> select the same group of Random Access Preambles as was selected for 2-step Random Access (190);
    2> else:
        3> if Random Access Preambles group B is configured (for 4 step CBRA) and size of MsgA payload > ra-Msg3SizeGroupA (ra-Msg3SizeGroupA is configured in 4 step RA configuration) (175):
            4> select the Random Access Preambles group B (185).
        3> else:
            4> select the Random Access Preambles group A (180).

1> else if Msg3 buffer is empty:
  2> if Random Access Preambles group B is configured:
    3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
    3> if the Random Access procedure was initiated for the CCCH logical channel and the CCCH SDU size plus MAC subheader is greater than ra-Msg3SizeGroupA:
      4> select the Random Access Preambles group B.
    3> else:
      4> select the Random Access Preambles group A.
  2> else:
    3> select the Random Access Preambles group A In an alternate embodiment UE select random access preamble group as follows:
1> if the RA Type is switched from 2-step RA to 4-step RA:
  2> if Random Access Preambles group B is configured (for 4 step CBRA) and size of MsgA payload > ra-Msg3SizeGroupA (ra-Msg3SizeGroupA is configured in 4 step RA configuration):
    3> select the Random Access Preambles group B.
  2> else:
    3> select the Random Access Preambles group A.
1> else same as other embodiments.

In an embodiment UE select random access preamble group as follows upon switching to 4 step RA:
1> if the RA Type is switched from 2-step RA to 4-step RA:
  2> if Random Access Preambles group was selected for 2-step Random Access (or if contention based random access resource or preamble was selected during the 2-step Random Access or if all the 2 step random access attempts were not based on contention free resources):
    3> select the same group of Random Access Preambles as was selected for 2-step Random Access;
  2> else:
    3> select the Random Access Preamble group indicated by gNB (e.g. in rachConfig dedicated of RRC reconfiguration message) or Random Access Preamble group corresponding to PUSCH resource configuration used during the 2 step RA attempts before switching to 4 step RA (note that here 2 step RA is 2 step CFRA as no preamble group was selected during the 2 step RA attempts). Random Access Preamble group associated with PUSCH resource configuration is indicated by GNB. Network signals PUSCH resource configuration for preamble group A and PUSCH resource configuration for preamble group B. The TBS of MsgA payload for transmitting MsgA using PUSCH resource in PUSCH resource configuration for preamble group A is the TBS of MsgA payload associated with preamble group A. The TBS can be determined based on number of PRBs per PUSCH resource and MCS in the PUSCH resource configuration. Similarly, the TBS of MsgA payload for transmitting MsgA using PUSCH resource in PUSCH resource configuration for preamble group B is the TBS of MsgA payload associated with preamble group B. The preamble group associated with PUSCH resource configuration for 2 step CFRA is preamble group B if the TBS of MsgA payload for transmitting MsgA using PUSCH resource in PUSCH resource configuration of 2 step CFRA is equal to TBS of MsgA payload associated with preamble group B. The preamble group associated with PUSCH resource configuration for 2 step CFRA is preamble group A if the TBS of MsgA payload for transmitting MsgA using PUSCH resource in PUSCH resource configuration of 2 step CFRA is equal to TBS of MsgA payload associated with preamble group A.
1> else same as other embodiments.

In an embodiment UE select random access preamble group as follows upon switching to 4 step RA:
1> if the RA Type is switched from 2-step RA to 4-step RA:
  2> select the Random Access Preamble group indicated by gNB (e.g. in rachConfig dedicated of RRC reconfiguration message) or Random Access Preamble group corresponding to PUSCH resource configuration used for 2 step RA attempts before switching to 4 step RA (note that here 2 step RA is 2 step CFRA as no preamble group was selected during the 2 step RA attempts). Random Access Preamble group associated with PUSCH resource configuration is indicated by GNB.
1> else same as other embodiments.

In an embodiment UE select random access preamble group as follows upon switching to 4 step RA:
1> if the RA Type is switched from 2-step RA to 4-step RA:
  2> if contention based random access was selected during the 2-step Random Access:
    3> select the same group of Random Access Preambles as was selected for 2-step Random Access;
  2> else:
    3> if Random Access Preambles group B is configured (for 4 step CBRA) and size of MsgA payload > ra-Msg3SizeGroupA (ra-Msg3SizeGroupA is configured in 4 step RA configuration):
      4> select the Random Access Preambles group B.
    3> else:
      4> select the Random Access Preambles group A.
1> else same as other embodiments:
Step 8: Stop.

[Embodiment 2]—Channel Access Priority Class (CAPC) and Configured Grant Handling FIG. 2 illustrates an exemplary listen-before-talk (LBT) parameters in accordance with an embodiment of the disclosure.

LBT procedure is vital for fair and friendly coexistence of devices and technologies operating in unlicensed spectrum. LBT procedures on a node attempting to transmit on a carrier in unlicensed spectrum require the node to perform a clear channel assessment to determine if the channel is free for use. The various types or categories of LBT procedures used for transmission are as follows:

Category 1: No LBT
  No LBT procedure is performed by the transmitting entity.

Category 2: LBT without random back-off
  The duration of time that the channel is sensed to be idle before the transmitting entity transmits is deterministic. In an example sensing interval can be 25 us i.e. UE can transmit, after sensing the channel to be idle for at least a sensing interval Td=25 us. For UL transmission category 3 is also referred as Type 2 channel access procedure.

Category 3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel. The detailed category 3 LBT procedure is as follows:

UE transmits after sensing the channel to be idle during the slot durations of a defer duration (Td); and after the counter is zero in step 4. The detailed procedure is as follows:

Step 1: set N=Ninit, where Ninit is a random number uniformly distributed between 0 and CWp. CWp is the contention window for a given channel access priority class 'p'. The various LBT parameters for different CAPC are shown in the table of FIG. 2 for example.

If the absence of any other technology sharing the carrier can be guaranteed on a long term basis (e.g. by level of regulation), the maximum channel occupancy time for LBT priority classes 3 and 4 is for 10 msec. Otherwise, maximum channel occupancy time for LBT priority classes 3 and 4 is for 8 msec.

Step 2: if N>0, decrement the counter, set N=N−1

Step 3: Sense the channel for an additional slot duration (Ts). If the additional slot duration is idle, go to step 4 else, go to step 5

Step 4: if N=0, perform transmission, Else, go to step 2

Step 5: sense the channel during the slot durations of an additional defer duration Td. Defer duration (Td) is equal to Tf+mp*Ts, where Tf is equal to 16 us and Ts is equal to 9 us.

Step 6: If the channel is sensed to be idle during Td, go to step 2, Else, go to step 5

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. The detailed procedure is same as category 3. Only difference is that in category 3 size of contention window is fixed whereas in category 4 the transmitting entity can vary the size of the contention window when drawing the random number N. For UL transmission category 4 is also referred as Type 1 channel access procedure.

In NR system design, in the uplink, the gNB can dynamically allocate resources to UEs via the C-RNTI on PDCCH(s). A UE always monitors the PDCCH(s) in order to find possible grants for uplink transmission when its downlink reception is enabled (activity governed by discontinuous reception (DRX) when configured). When CA is configured, the same C-RNTI applies to all serving cells. In addition, with Configured Grants, the gNB can allocate uplink resources for the initial HARQ transmissions to UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

FIG. 3 illustrates an exemplary channel access priority class (CAPC) values in accordance with an embodiment of the disclosure.

FIG. 3 shows which CAPC should be used by traffic belonging to the different standardized 5G quality of service identifiers (5QIs). A non-standardized 5QI (i.e. operator specific 5QI) should use suitable CAPC based on the table of FIG. 3, i.e. CAPC used for a non-standardized 5QI should be the CAPC of the standardized 5QIs which best matches the traffic class of the non-standardized 5QI.

For data radio bearers (DRBs), the gNB selects the CAPC by taking into account the 5QIs of all the QoS flows multiplexed in this DRB while considering fairness between different traffic types and transmissions. For signaling radio bearer 0 (SRB0), SRB1, and SRB3, the CAPC is always the highest priority (i.e. the lowest number in Tables of FIGS. 2 and 3). For uplink transmissions on configured grants, the gNB configures the UE for the CAPC to be used for SRB2 and DRBs. For uplink transmissions on configured grants, the UE shall select the CAPC of DCCH if DCCH SDU is transmitted and otherwise the lowest priority CAPC (i.e. highest number in tables of FIGS. 2 and 3) of the logical channel(s) with MAC SDU and of the MAC CE(s) multiplexed in this MAC PDU. The MAC CEs except padding BSR and recommended bit rate use the highest priority CAPC (i.e. lowest number in tables of FIGS. 2 and 3). The padding BSR and recommended bit rate MAC CEs use the lowest priority CAPC.

For the case DCCH SDU is not included in MAC PDU and padding BSR is included in the MAC PDU, selected CAPC for the MAC PDU is lowest priority CAPC. Note that padding BSR is included if the amount of padding to be included in MAC PDU is greater than or equal to 2 bytes (or size of short BSR). Padding BSR is sent to gNB for informative purpose. So inclusion of padding BSR in MAC PDU leads to usage of low priority CAPC for the MAC PDU even if the lowest priority CAPC amongst all the logical channel(s) with MAC SDU and of the MAC CE(s) other than padding BSR MAC CE multiplexed in this MAC PDU has higher priority. So some enhancement is needed.

Embodiment 2-1

In one method, For the configured uplink grant on unlicensed carrier (i.e. serving cell operating on unlicensed spectrum or frequency band):

UE has UL resources allocated for UL transmission.

If UL resources are allocated and if number of padding bits is equal to or larger than the size of the Buffer Status Report MAC CE plus its subheader, UE shall trigger padding BSR CAPC for channel access if UL resources are allocated for unlicensed spectrum is as follows:

If the MAC SDU of DCCH logical channel is included in MAC PDU:

UE select the CAPC of DCCH.

Else: UE select the lowest priority CAPC (highest number in tables of FIGS. 2 and 3) of logical channel(s) with MAC SDU and of the MAC CE(s) other than the padding BSR MAC CE multiplexed in the MAC PDU. Here the assumption is that the MAC PDU includes at least a MAC CE other than padding BSR MAC CE or MAC SDU.

CAPC for channel access if UL resources are allocated for unlicensed spectrum is as follows:
 If the MAC SDU of DCCH logical channel is included in MAC PDU:
  UE select the CAPC of DCCH.
 Else: UE select the lowest priority CAPC (highest number in tables of FIGS. 2 and 3) of logical channel(s) with MAC SDU and of the MAC CE(s) other than the padding BSR MAC CE and recommended bit rate MAC CE multiplexed in the MAC PDU. Here the assumption is that the MAC PDU includes at least a MAC CE other than padding BSR MAC CE and recommended bit rate MAC CE or MAC SDU. For example, if MAC PDU includes a MAC SDU (CAPC 2) and a MAC CE (CAPC 3) other than the padding BSR MAC CE and recommended bit rate MAC CE, CAPC of MAC PDU is CAPC 3. Note that higher number means low priority.

Embodiment 2-2

UE has UL resources allocated for UL transmission.
If UL resources are allocated dynamically:
If number of padding bits is equal to or larger than the size of the Buffer Status Report MAC CE plus its subheader, UE shall trigger padding BSR. For triggered padding BSR, padding BSR MAC CE is included in MAC PDU.
CAPC for channel access if UL resources are allocated for unlicensed spectrum is provided by gNB
Else (i.e. for configured UL grant):
if UL resources are allocated for shared spectrum (i.e. for serving cell operating on unlicensed spectrum or frequency band), UE shall not trigger padding BSR.
if UL resources are allocated for licensed spectrum (i.e. for serving cell operating on licensed spectrum or frequency band) and number of padding bits is equal to or larger than the size of the Buffer Status Report MAC CE plus its subheader, UE shall trigger padding BSR. For triggered padding BSR, padding BSR MAC CE is included in MAC PDU.
CAPC for channel access if UL resources are allocated for unlicensed spectrum is as follows:
 If the MAC SDU of DCCH logical channel is included in MAC PDU to be transmitted in UL grant:
  UE select the CAPC of DCCH.
 Else: UE select the lowest priority CAPC (highest number in tables of FIGS. 2 and 3) of logical channel(s) with MAC SDU and of the MAC CE(s) multiplexed in the MAC PDU to be transmitted in UL grant.

Embodiment 2-3

UE has UL resources allocated for UL transmission.
If UL resources are allocated dynamically:
If number of padding bits is equal to or larger than the size of the Buffer Status Report MAC CE plus its subheader, UE shall trigger padding BSR. For triggered padding BSR, padding BSR MAC CE is included in MAC PDU.
CAPC for channel access if UL resources are allocated for unlicensed spectrum is provided by gNB
Else (i.e. for configured UL grant):
if UL resources are allocated for shared spectrum (i.e. for serving cell operating on unlicensed spectrum or frequency band):
 if MAC SDU of DCCH logical channel is included in MAC PDU and number of padding bits is equal to or larger than the size of the Buffer Status Report MAC CE plus its subheader, UE shall trigger padding BSR
 if MAC SDU of DCCH logical channel is not included in MAC PDU and lowest priority of logical channel(s) with MAC SDU and of the MAC CE(s) other than the padding BSR MAC CE multiplexed in the MAC PDU is equal to priority of padding BSR MAC CE (or is equal to lowest priority CAPC) and number of padding bits is equal to or larger than the size of the Buffer Status Report MAC CE plus its subheader, UE shall trigger padding BSR.
if UL resources are allocated for licensed spectrum (i.e. for serving cell operating on licensed spectrum or frequency band) and number of padding bits is equal to or larger than the size of the Buffer Status Report MAC CE plus its subheader, UE shall trigger padding BSR. For triggered padding BSR, padding BSR MAC CE is included in MAC PDU.
CAPC for channel access if UL resources are allocated for unlicensed spectrum is as follows:
 If the MAC SDU of DCCH logical channel is included in MAC PDU to be transmitted in UL grant:
  UE select the CAPC of DCCH.
 Else: UE select the lowest priority CAPC (highest number in tables of FIGS. 2 and 3) of logical channel(s) with MAC SDU and of the MAC CE(s) multiplexed in the MAC PDU to be transmitted in UL grant.

Embodiment 2-4

UE has UL resources allocated for UL transmission.
If UL resources are allocated dynamically:
If number of padding bits is equal to or larger than the size of the Buffer Status Report MAC CE plus its subheader, UE shall trigger padding BSR. For triggered padding BSR, padding BSR MAC CE is included in MAC PDU.
CAPC for channel access if UL resources are allocated for unlicensed spectrum is provided by gNB
Else (i.e. for configured UL grant):
if UL resources are allocated for shared spectrum (i.e. for serving cell operating on unlicensed spectrum or frequency band):
 if MAC SDU of DCCH logical channel is included in MAC PDU and number of padding bits is equal to or larger than the size of the Buffer Status Report MAC CE plus its subheader, UE shall trigger padding BSR
if UL resources are allocated for licensed spectrum (i.e. for serving cell operating on licensed spectrum or frequency band) and number of padding bits is equal to or larger than the size of the Buffer Status Report MAC CE plus its subheader, UE shall trigger padding BSR. For triggered padding BSR, padding BSR MAC CE is included in MAC PDU.

CAPC for channel access if UL resources are allocated for unlicensed spectrum is as follows:
    If the MAC SDU of DCCH logical channel is included in MAC PDU to be transmitted in UL grant:
        UE select the CAPC of DCCH.
    Else: UE select the lowest priority CAPC (highest number in tables of FIGS. 2 and 3) of logical channel(s) with MAC SDU and of the MAC CE(s) multiplexed in the MAC PDU to be transmitted in UL grant.

Figure 4:
FIG. 4 is a block diagram of a terminal according to an embodiment of the disclosure.

FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the UE illustrated in the figures, e.g., FIGS. 1, 2, and 3, or described above. Although the transceiver 410, the controller 420 and the memory 430 are shown as separate entities, they may be realized as a single entity like a single chip. Alternatively, the transceiver 410, the controller 420 and the memory 430 may be electrically connected to or coupled with each other.

The transceiver 410 may transmit and receive signals to and from other network entities, e.g., a base station.

The controller 420 may control the terminal to perform functions according to one of the embodiments described above. For example, the controller 420 controls the transceiver 410 and/or memory 430 to perform random access procedure related operations according to various embodiments of the disclosure.

In an embodiment of the disclosure, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using at least one processor or a central processing unit (CPU).

Figure 5:
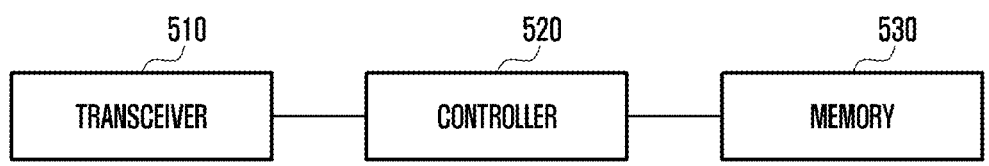
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520 and a memory 530. The controller 520 may refer to a circuitry, an application-specific integrated circuit (ASIC), or at least one processor. The transceiver 510, the controller 520 and the memory 530 are configured to perform the operations of the UE illustrated in the figures, e.g., FIGS. 1, 2, and 3, or described above. Although the transceiver 510, the controller 520 and the memory 530 are shown as separate entities, they may be realized as a single entity like a single chip. Alternatively, the transceiver 510, the controller 520 and the memory 530 may be electrically connected to or coupled with each other.

The transceiver 510 may transmit and receive signals to and from other network entities, e.g., a terminal.

The controller 520 may control the UE to perform functions according to one of the embodiments described above. For example, the controller 520 controls the transceiver 510 and/or memory 530 to perform random access procedure related operations according to various embodiments of the disclosure.

In an embodiment of the disclosure, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
    receiving, from a base station, information on a maximum number of message A preamble transmissions;
    identifying that a preamble transmission counter value for a 2-step random access procedure equals a value identified based on the information on the maximum number of message A preamble transmissions;
    identifying a random access type from 2-step to 4-step;
    identifying whether a first random access preambles group was selected during the 2-step random access procedure;
    selecting a second random access preambles group for a contention-based 4-step random access procedure based on a message A configuration for the 2-step random access procedure, in case that the first random access preambles group was not selected during the 2-step random access procedure;
    selecting the same first random access preambles group for the contention-based 4-step random access procedure, in case that the first random access preambles group was selected during the 2-step random access procedure; and
    performing a random access preamble transmission for the contention-based 4-step random access procedure based on the selected random access preambles group.

2. The method of claim 1, wherein the second random access preambles group includes a random access preambles group A or a random access preambles group B, and
    wherein, in case that the message A configuration for the 2-step random access procedure corresponds to a configuration for the random access preambles group B, the random access preambles group B is selected for the second random access preambles group.

3. The method of claim 2, wherein, in case that the message A configuration for the 2-step random access procedure does not correspond to the configuration for the random access preambles group B, the random access preambles group A is selected for the second random access preambles group.

4. The method of claim 1, wherein the random access type is switched from the 2-step to the 4-step further based on an expiration of a random access response window for the 2-step random access procedure.

5. The method of claim 1, wherein the random access type is switched from the 2-step to the 4-step further based on an expiration of a contention resolution timer for the 2-step random access procedure.

6. The method of claim 1, wherein the second random access preambles group includes a random access preambles group A or a random access preambles group B, and wherein, in case that a message A payload size configured for the 2-step random access procedure corresponds to a message A payload size associated with the random access preambles group B, the random access preambles group B is selected for the second random access preambles group.

7. The method of claim 6, wherein, in case that the message A payload size configured for the 2-step random access procedure does not correspond to the message A payload size associated with the random access preambles group B, the random access preambles group A is selected for the second random access preambles group.

8. A terminal in a wireless communication system, the terminal comprising:

a transceiver; and a controller configured to:

receive, from a base station via the transceiver, information on maximum number of message A preamble transmissions, identify that a preamble transmission counter value for a 2-step random access procedure equals a value identified based on the information on the maximum number of message A preamble transmissions, identify a random access type from 2-step to 4-step, identify whether a first random access preambles group was selected during the 2-step random access procedure, select a second random access preambles group for a contention-based 4-step random access procedure based on a message A configuration for the 2-step random access procedure, in case that the first random access preambles group was not selected during the 2-step random access procedure, select the same first random access preambles group for the contention-based 4-step random access procedure, in case that the first random access preambles group was selected during the 2-step random access procedure, and perform a random access preamble transmission for the contention-based 4-step random access procedure based on the selected random access preambles group.

9. The terminal of claim 8, wherein the second random access preambles group includes a random access preambles group A or a random access preambles group B, and wherein, in case that the message A configuration for the 2-step random access procedure corresponds to a configuration for the random access preambles group B, the random access preambles group B is selected for the second random access preambles group.

10. The terminal of claim 9, wherein, in case that the message A configuration for the 2-step random access procedure does not correspond to the configuration for the random access preambles group B, the random access preambles group A is selected for the second random access preambles group.

11. The terminal of claim 8, wherein the random access type is switched from the 2-step to the 4-step further based on an expiration of a random access response window for the 2-step random access procedure expires.

12. The terminal of claim 8, wherein the random access type is switched from the 2-step to the 4-step further based on an expiration of a contention resolution timer for the 2-step random access procedure expires.

13. The terminal of claim 8, wherein the second random access preambles group includes a random access preambles group A or a random access preambles group B, and wherein, in case that a message A payload size configured for the 2-step random access procedure corresponds to a message A payload size associated with the random access preambles group B, the random access preambles group B is selected for the second random access preambles group.

14. The terminal of claim 13, wherein, in case that the message A payload size configured for the 2-step random access procedure does not correspond to the message A payload size associated with the random access preambles group B, the random access preambles group A is selected for the second random access preambles group.

* * * * *